Feb. 23, 1937.  F. L. O. WADSWORTH  2,071,669
BRAKE
Filed July 27, 1932  2 Sheets-Sheet 1
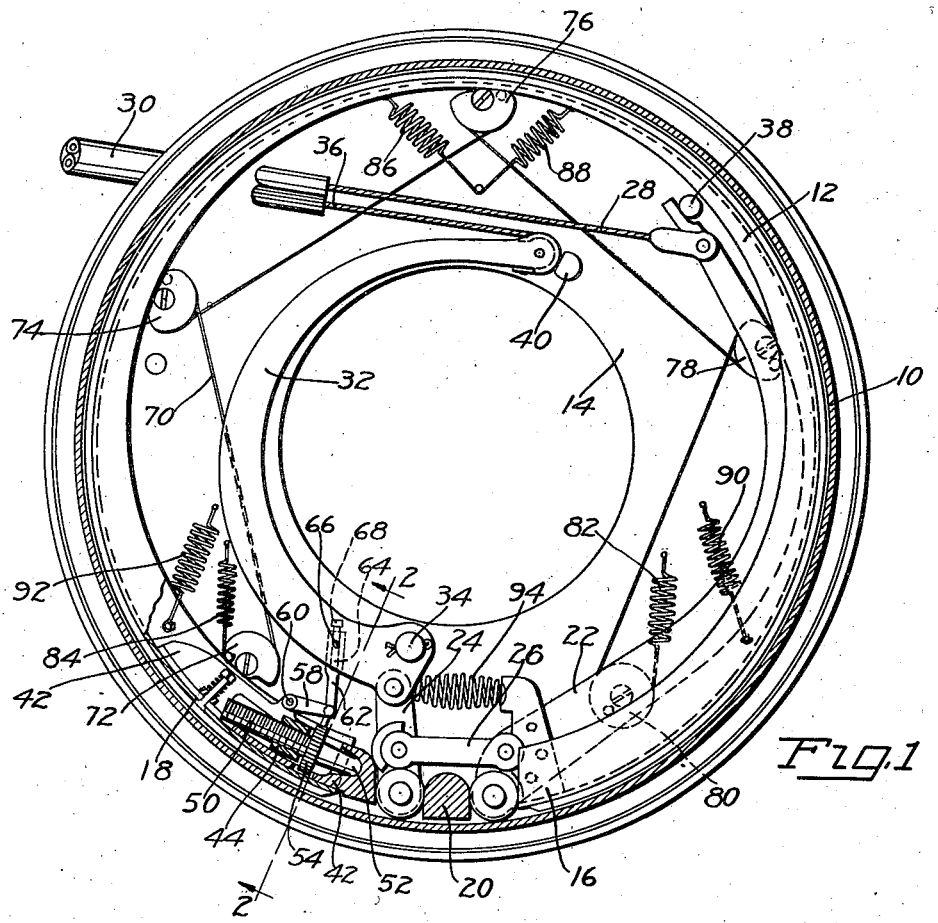
Fig.1
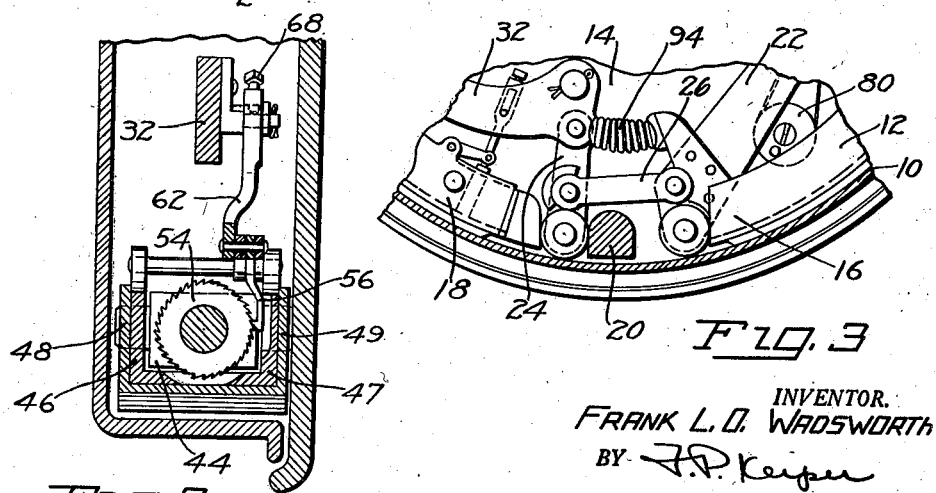
Fig.2
Fig.3
INVENTOR.
FRANK L. O. WADSWORTH
BY
ATTORNEY

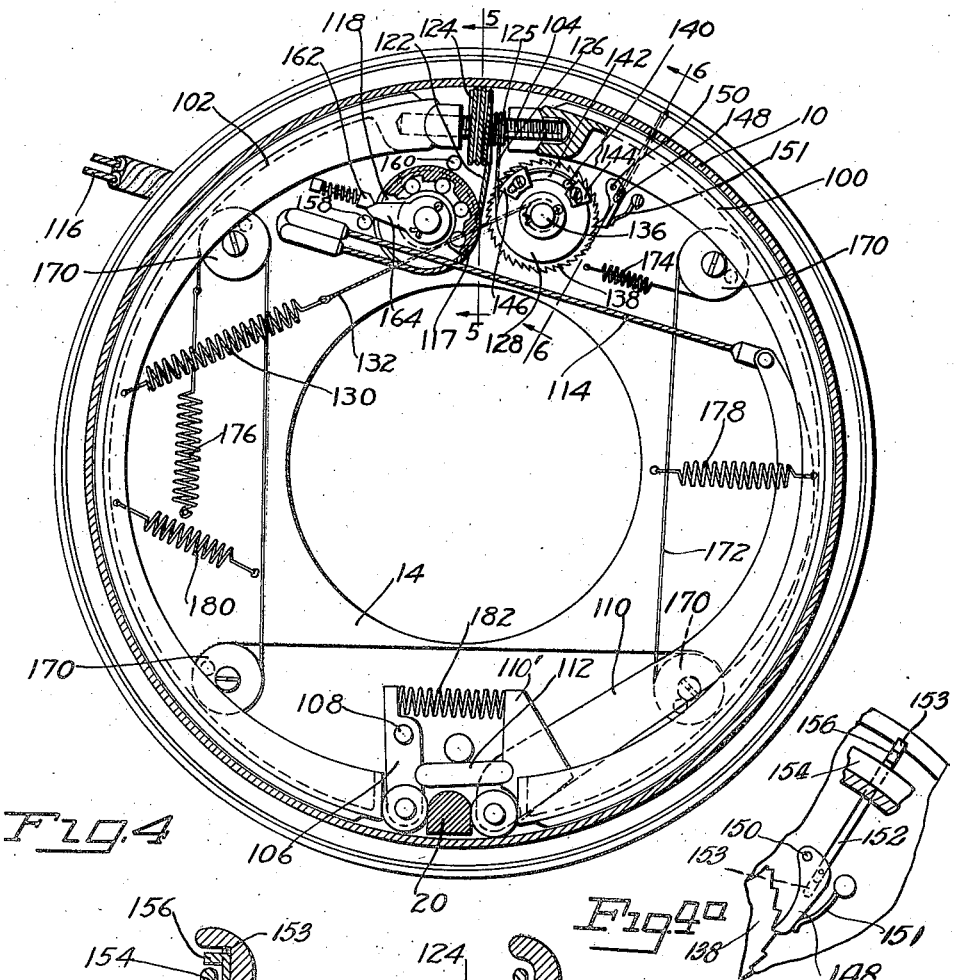
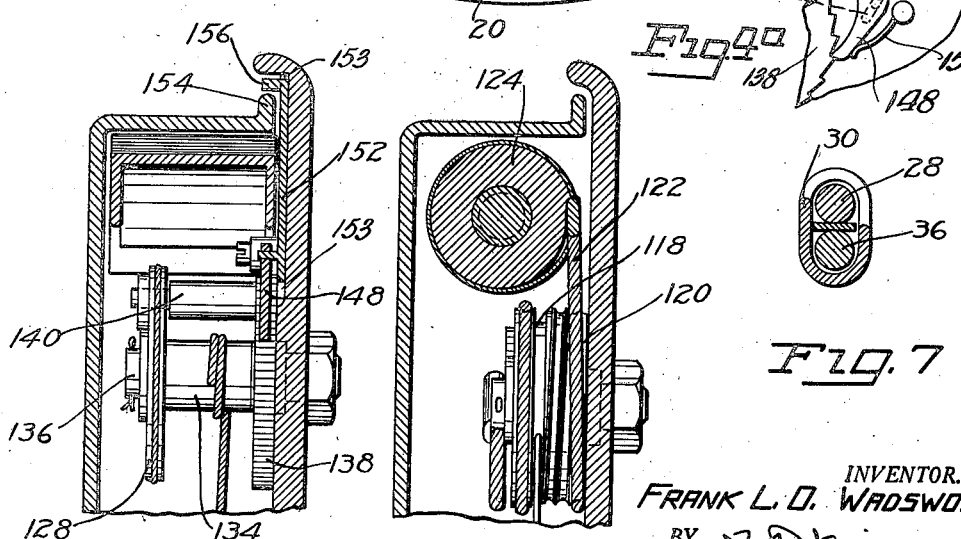

Patented Feb. 23, 1937

2,071,669

UNITED STATES PATENT OFFICE 2,071,669

BRAKE

Frank L. O. Wadsworth, East Liberty, Pa., assignor to Bendix Aviation Corporation, South Bend, Ind., a corporation of Delaware Application July 27, 1932, Serial No. 625,116

11 Claims. (Cl. 188—79.5)

This invention relates to brakes and more particularly those of the internal expanding type.

In the usual present day automotive vehicle brake the actual movement of the operating elements, such as the brake pedal or hand brake lever, is considerably less than the movement through which these pedals or levers are adapted to travel during the life and wear of the brake. This additional movement is held in reserve and is necessary so that the brake may not have to be adjusted for wear during long periods of operation, and further is necessary since during extended periods of operation considerable heating of the brake takes place which results in expansion of the brake drum permitting abnormal movement of the brake controls. Various automatic adjustment devices have been developed which are adapted to conserve the amount of reserve movement necessary of the brake operating elements by retaining the brake constantly in adjustment, but in general they fail to take into account the heat expansion of the drum.

This invention relates to improvements which may permit reduction in the reserve operating control movement, allowing substantially full movement of the operating control for normal brake application resulting in greater mechanical advantage and corresponding ease of operation. This result may be accomplished by a novel automatic adjustment mechanism operable upon actuation of the usual hand or auxiliary brake of a motor vehicle and also adapted to be rendered inoperative at such times as the drum may have heated unduly. Also by arranging the auxiliary brake operating means to operate in series with the customary service brake operating means, there is provided ample reserve by the application of both auxiliary and service brake means simultaneously.

It is accordingly an object of this invention to provide a brake having the above referred to improved characteristics.

Another object of the invention is to provide a novel brake adapted to be actuated in series by two operating means.

Another object of the invention is the provision of braking means having two operating controls and an automatic adjustment adapted to be actuated upon operation of one of the controls.

A still further object of the invention is the provision of means for rendering an automatic adjustment mechanism inoperable during periods of excessive drum expansion.

A still further object of the invention is the provision of steady rest means adapted to retain uniform clearance between a brake friction shoe and its drum during brake release and adapted for automatic adjustment.

A further object of the invention is the provision of a steady rest means adapted to follow the movement of the brake shoe into engagement and provide uniform clearance for the shoes when disengaged.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 1 is a front elevation partly in section showing a preferred form of internal expanding brake according to this invention;

Figure 2 is a section through Figure 1 on the line 2—2 showing in detail the automatic adjustment mechanism thereof;

Figure 3 is a showing of the actuating mechanism of Figure 1 when in brake applied position and counterclockwise rotation of the brake drum;

Figure 4 is a front elevation of a slightly modified form of the invention embodying the characteristics of the modification of Figure 1;

Figure 4a is a fragmentary enlargement of a portion of Fig. 4.

Figure 5 is a section of Figure 4 on the line 5—5;

Figure 6 is a section of Figure 4 on the line 6—6 illustrating a portion of the automatic adjustment mechanism; and Figure 7 is a section through the operating cable showing the use of two tension members in a single conduit.

Referring more particularly to Figure 1, there is shown therein the usual brake drum 10, brake shoe or band or other friction means 12, and backing plate 14. The brake shoe 12 is illustrated as being in the form of a band having adjacent ends 16 and 18 and an anchor 20 located therebetween. For the purpose of actuating the brake, a pair of levers 22 and 24 located between each of the ends and the anchor 20 are provided with a connecting link 26. The lever 22 is adapted to be operated directly by the tension member 28 passing through one side of a flexible Bowden type conduit 30 or the like, whereas the lever 24 is adapted to be actuated through the lever 32 fulcrumed at 34 and operated by the tension member 36 shown as passing through the same conduit 30. Suitable stops 38 and 40 are provided for the levers 22 and 32 respectively in order to fix their released position.

As may be seen, actuation of either lever 22 or 32 will spread the shoe 12, and the actuation of both levers simultaneously will spread the shoe 12 an amount equal to the sum of both lever movements.

In order to provide for the continuous and automatic adjustment of the brake shoe 12 to compensate for wear the shoe end 18 is provided with a member 42 adapted to slide relative to the end of the shoe 18 to provide expansion thereof.

A threaded block 44 pivoted in the channels 46 and 47 to the brake shoe by means of trunnions 48 and 49, carries an adjustment screw 50 having an end 52 engaging and adapted to thrust the slidable member 42. In order to rotate the screw or its equivalent automatically, a ratchet wheel 54 and an associated pawl 56 which is in turn carried on a movable device such as a pivoted link 58 pivoted to the shoe end, as at 60 may be provided. Movement is imparted to the pawl 56 by means of the link 62 having a lost motion slot 64 in which rides a pin 66 secured in the actuating lever 32. The length of the lost motion slot may be suitably adjusted by means of the screw 68 which may be employed to lengthen or shorten the slot as desired.

A plurality of steady rests, which may be in the form of cams or crank eccentrics 72, 74, 76, 78, and 80, as shown in Figure 1, may be provided to maintain the shoe in proper relation to the drum, throughout its wear and life, and which cams may be provided respectively with thrust pins engaging the inner edge of the friction band. There is preferably provided, for the purpose of actuating the steady rests, a tension member 70 which is wrapped about portions of the cams 72, 74, 76, 78, and 80, and is secured at its ends by springs 82 and 84. In order to hold the cams against the shoes at all times, the spring 82 is stiffer than 84. However, the differential between the springs 82 and 84 is insufficient to counteract the effect of the release springs 86, 88, 90, and 92, which may be provided at suitable points to urge the shoe into released position. Spring 94 may also be provided between the levers 24 and 22 to normally urge the actuating mechanism into released position.

It will, of course, appear that the contour of cams 72, 74, 76, 78, and 80 may be varied in accordance with their position around the brake band so as to give greater movement to parts of the brake band which may wear more rapidly as the brake wears and thus retain uniform clearance throughout the life of the brake by the automatic adjustment mechanism.

The modification shown in Figure 4 differs slightly from that of Figure 1 in that the friction means is split diametrically opposite the anchor, in order to afford a combined actuating and adjustment mechanism. As shown, there is provided the usual brake drum 10 together with a pair of friction shoes 100 and 102, an anchor 20 situated between one pair of adjacent ends of the brake shoes and a high pitch right and left hand adjusting screw 104 between the other pair of adjacent ends. The actuating mechanism situated adjacent the anchor 20 consists of a short pivoted lever 106 extending between the anchor and one end of the shoe 102 pivoted to the backing plate 14 as at 108; and a second lever 110 extending between the end of shoe 100 and the anchor 20, and a compression link 112 located between the levers, and having rounded ends pivotally seated in semi-cylindrical notches in lever 106 and in a projecting part 110' welded to lever 110 and forming a rigid part thereof.

As in Figure 1, the lever 110 may be actuated by a tension cable 114. The auxiliary actuating mechanism, which is adapted to rotate the right and left adjusting screw 104, comprises an actuating cable 116 which in turn wraps upon a drum 118. An overrunning clutch 117 situated between the drum 118 and a drum 120, is adapted to transmit a pull of cable 116 to the drum 120, and in turn wraps cable 122 which extends around the drum 124 provided upon the adjusting screw 104. A second drum 125 of smaller diameter than that of drum 124 is provided upon the adjusting screw 104, and wrapped thereon is a cable 126 which is also wrapped upon the drum 128. A spring 130, together with a cable 132 wrapped upon another drum 134, is adapted to retain the cables 126 and 122 in tension throughout brake actuation.

Upon the spindle 136 which carries the drums 128 and 134, is freely pivoted a ratchet wheel 138 which is connected to the drum 128 through a lost motion connection comprising the crank pin 140 operating in the arcuate slot 142 provided in the drum 128. For adjustment purposes, the length of the slot 142 may be varied by movement of the adjustable segments 144 and 146. A pawl 148 pivoted to the backing plate, as at 150, is adapted to engage the ratchet 138 and to be urged in engagement therewith by a light spring 151.

Since it is preferable that no adjustment take place during heated drum conditions, there is provided a link 152 slidably seated in a groove 153 and which is pivoted to the pawl 148 with a short lever arm from the pawl pivot 150; which link is adapted to engage the smooth surface of the outside flange 154 of the brake drum by means of the turned over portion 156. A small clearance is normally provided between the portion 156 of the link 152 and the flange 154 in order that no wear may ordinarily take place between these members but the small clearance is no greater than the normal resilient expansion of the drum during brake application.

It it preferable to provide stops 158 and 160 to limit the movement of the cable 116 and there is also provided a snap action to retain the auxiliary brake in released position, which snap action is illustrated as comprising a latch member 162 resiliently pressed into engagement with the detent 164 carried by the drum 118. A suitable light spring may be provided within the drums 118 and 120 in order to urge the drum 118 towards released position.

As shown in Figure 1, a plurality of steady rests 170 may be provided which are inter-connected by a band 172 and resiliently urged into contact with the shoe between differential action of springs 174 and 176. Other springs 178 and 180, together with spring 182 are provided to urge the brake normally into released position. Spring 182 is held compressed between lever 106 and part 110' of lever 110.

Referring to the modification shown in Figure 1, it will be seen that upon a pull on either cable 36 or cable 28, the friction shoe will be expanded and driven into engagement with the brake drum. Preferably in practice, cable 28 is connected to the service brake lever and cable 36 is connected to the auxiliary or hand brake lever. Should wear take place permitting extreme actuation of the hand brake, lever 32 would be moved to abnormal position and pin 66 carried thereby would be moved to the lower end of the slot 64 and will thereupon actuate the pawl 56; and if the abnormal movement is sufficient, the pawl will engage a new tooth on the ratchet wheel 54 and upon release movement will actuate the screw 50 thereby increasing the effective length of the brake band to compensate for wear.

As has been pointed out, both the service brake and auxiliary brake are adapted to expand the braking shoe cumulatively. Accordingly, it is not necessary to provide a great amount of pedal reserve in the service brake, for should the shoe become worn or the drum temporarily expanded, an application of the auxiliary brake in combination with the service brake will provide any amount of reserve which may be required. The lack of reserve in the service brake or the auxiliary brake when used alone, prevents over adjustment of the automatic adjustment mechanism as a result of drum heat expansion for the automatic adjustment is operable only upon actuation of the auxiliary brake and its movement is limited to a normal movement plus a slight abnormal movement sufficient to provide a single tooth adjustment of the ratchet wheel, there being practically no reserve movement.

Since extreme operation of the parking brake does not usually occur during driving conditions, the operation of the automatic adjustment will seldom, if ever, take place when the brake drum is overheated. The steady rests 72, 74, 76, 78, and 80, as may be seen, constantly follow the movement of the shoe, but are preferably so adapted as to provide a uniform clearance between the shoe and the drum when the brake is in disengaged position.

The cams or eccentricity of the cranks may be varied, so as to provide a greater movement of a part of the shoe with respect to the drum part where the greater wear takes place, so that as the cams follow the shoe the clearance throughout the life of the brake lining will remain uniform. It will be observed, of course, that the actuating mechanism determines the amount of clearance, while the steady rests merely provide for the uniform distribution of this clearance around the brake shoe.

The modification of Figure 4 is adapted to give the same results as that of Figure 1, but is provided with an auxiliary actuating means diametrically opposite the service actuating mechanism. The service actuating mechanism will be seen to be similar to that of Figure 1, while the auxiliary actuating mechanism will be seen to comprise a sharp pitched threaded member 104.

In operation, actuation of the auxiliary cable 116 will rotate the drum 118 which through the overrunning clutch 117 drives the drum 120. Cable 122 which wraps upon the drum 120 will wrap from drum 124 rotating the screw 104 and spread the shoes into engagement. At the same time cable 122 is unwrapping from 124, cable 126 is wrapped upon the drum 125, thus causing the drum 128 to rotate in a clockwise direction together with drum 134 which in turn stretches a return spring 130.

As may be seen in Figure 4, rotation of the drum 128, which is provided with a slot 142, may proceed until the abutment 146 engages the crank pin 140, thereafter rotating the ratchet 138 with respect to the pawl 148. It will, of course, be observed that movement of the ratchet takes place only after the crank pin 140 travels the length of the slot 142 which is preferably adjusted by means of the abutments 146 and 144, so as to permit a normal movement without operation of the ratchet.

Assuming that adjustment has taken place, that is, the ratchet has been turned one tooth, release movement of the cable 116 permits the return of drums 128, 134, 124, 125, and 120 by reason of the spring located between drums 118 and 120. Since an adjustment has taken place, the drums with the exception of drum 118 will not return to their former position by reason of the abutment 144 and movement of crank pin 140; and drum 118 is enabled to return to its former position through the operation of the overrunning clutch 117, thus retaining a uniform movement for the auxiliary actuating means and a uniform brake engaging movement operable thereby. Pins 158 and 160 limit the movement of the cable 116 so that ordinarily a uniform or small adjustment only may be obtained in any one application. Since the automatic adjustment is provided on the auxiliary brake, there is little danger of adjustment taking place due to abnormal drum expansion but for the purpose of safe guarding under all circumstances, against such an adjustment the link 152, which is adapted to engage the drum flange 154, is positioned so as to disengage the pawl 148 on the ratchet wheel 138 during an abnormal drum expansion and thus prevent further adjustment.

While various embodiments and modifications of the invention have been illustrated and described, it is to be understood that the invention is not limited thereto but may be embodied in various mechanical forms. For example, various features of the modifications may be interchanged or mechanical equivalents substituted for those shown. As such changes in construction and arrangement of parts may be made without departing from the spirit of the invention as will be well understood by those skilled in the art, reference will be had to the appended claims for a definition of the limits of the invention.

I claim:

1. A brake mechanism comprising a drum, friction elements, two actuating means for effecting engagement therebetween and one of which operates the brake mechanism for service use involving considerable deceleration with consequent heating of the drum while the other is ordinarily operated only for parking purposes and when the drum is not heated, an automatic adjustment associated with said friction elements, and means to operate said automatic adjustment by actuation of said other actuating means.

2. A brake comprising a drum, friction means therefor, automatic wear adjusting mechanism, and means for rendering said wear adjusting mechanism inoperative upon expansion of said drum.

3. A brake comprising, a single anchor, a floating friction means, a pair of link connected levers interposed between said friction means and on either side of said anchor, and operating mechanism adapted to actuate either lever or both levers to expand said friction means.

4. A brake comprising a pair of friction shoes, an anchor between one pair of ends, an adjusting screw mechanism joining the other pair of ends, actuating means for turning said screw for brake operation, and automatic adjustment mechanism for regulating the range of movement of said adjusting screw mechanism.

5. A floating shoe single anchor brake actuating mechanism, comprising a pair of adjacent friction shoe ends, an anchor therebetween, a pair of floating levers extending between each end and the anchor, a link connecting said levers and actuating means connected to each of said levers.

6. A brake comprising a drum, a friction shoe, automatic adjustment mechanism for maintaining uniform shoe clearance during wear, and means rendering said automatic adjustment inoperative during periods of excessive expansion of said drum.

7. A brake comprising a drum, friction means and a support, a compression resisting flexible conduit, a pair of tension control elements passing therethrough, and actuating means for said friction means for each of said elements.

8. A brake comprising a drum, an automatic clearance adjuster, including a lost motion connection associated therewith permitting normal brake engaging movement without adjustment, and means for modifying the movement of the adjuster during heat expansion of said drum.

9. A brake comprising normal and auxiliary actuating mechanisms, automatic adjustment means for said brake operable upon actuation of said auxiliary mechanism, and means suspending adjustment thereof during heated brake conditions.

10. An automotive vehicle comprising a service brake operating member, and a parking brake operating member, a service brake having automatic adjustment mechanism for wear compensation, and means for operating said adjustment mechanism upon actuation of said parking brake operating member.

11. An automotive vehicle comprising a service brake operating member, and a parking brake operating member, a service brake having automatic adjustment mechanism for wear compensation, means for operating said adjustment mechanism upon actuation of said parking brake operating member, and means for rendering said adjustment inoperative during periods of excessive drum expansion.

F. L. O. WADSWORTH.